June 4, 1946.  K. H. WEBER  2,401,676
MACHINE FOR WINDING COILS
Original Filed Aug. 3, 1940
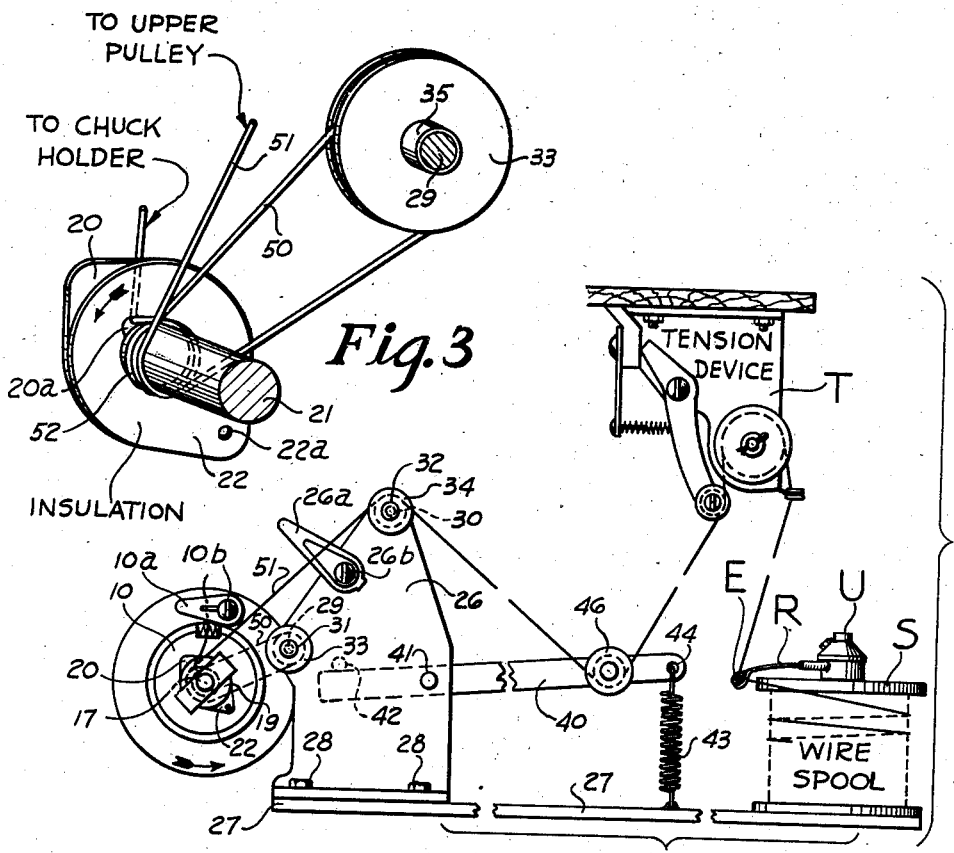
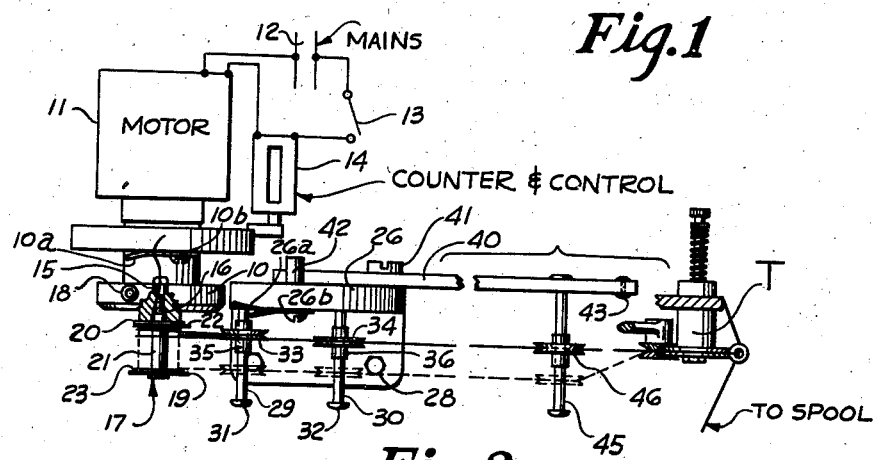
INVENTOR.
KARL H. WEBER
BY Falvey, Souther & Stottenberg
ATTORNEYS Patented June 4, 1946

2,401,676

UNITED STATES PATENT OFFICE 2,401,676

MACHINE FOR WINDING COILS

Karl H. Weber, Toledo, Ohio

Original application August 3, 1940, Serial No. 350,589. Divided and this application November 6, 1943, Serial No. 509,184

15 Claims. (Cl. 242—9)

This invention relates to the art of coil winding, more particularly to a machine for winding coils in even layers.

In the prior art, coils have long been wound for use in apparatus such as regulators and the like by the use of a traversing device which guided the wire into the coil bobbin. The results obtained by the use of this method have not been satisfactory for various reasons, particularly in that the method was difficult to control, so that the resistances of the various coils was not maintained within reasonable limits to change the electrical characteristics of the coil from a standard. The incontrollability of this method led to a high percentage of rejects which resulted in uneconomical production.

The present invention contemplates the provision of a novel machine for winding coils which will result in a coil having very uniform electrical characteristics, in which the resistance, particularly for a given number of turns, is held within very close limits. The new machine winds coils very uniform in all respects and is capable of being used by unskilled operators, particularly operators having such degree of skill as found in modern production lines, for fabricating coils with a very small percentage of rejects. The use of the machine has many advantages over the prior art from the technical point of view, and also allows production of coils which have a better appearance, so that the apparatus to which the coils are applied have greater salability.

The present invention further contemplates the provision of a machine for winding coils by layers, which is very flexible in its application and allows variation of the characteristics of the coil, such as change of wire size, change in the number of turns, change in the bobbin dimension etc. without great difficulty or expense such as found in the prior art structures.

In a copending application Serial No. 350,589, filed August 3, 1940 (Pat. No. 2,362,179, November 7, 1944), by Karl H. Weber, assigned to the same assignee, of which this application is a division, the method of winding coils incorporated in the machine to be disclosed herein is described and claimed.

It is, therefore, a principal object of this invention to provide a machine for winding coils which gives substantial uniformity in electrical characteristics of the completed coils and at the same time is adaptable for use with mass production.

It is a further object of this invention to provide a machine for winding coils in which the wire is positioned in the bobbin in even regular layers with the wires contiguous and substantially touching.

It is a further object of this invention to provide a machine for winding coils in layers which is cheap and expeditious and maintains the resistance of the coils with a given number of turns within a series within very close limits.

It is a further object of this invention to provide a machine for winding coils which is very flexible and allows change of wire size, number of turns, size of bobbin, etc., without completely changing the circumstances under which the coils are being wound.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Figure 1 is an elevational view.

Figure 2 is a plan view.

Figure 3 is an isometric view adjacent the spool.

Referring to the drawing, particularly to Figure 1, a chucking device 10 is provided which is driven by an electric motor 11 deriving its power from a source of electric current 12, the motor being under the control of a manual switch 13 which opens the circuit to the motor and also under the control of an automatic switching device 14 which is driven by the motor 11 and enables the chuck to be stopped after a predetermined number of revolutions have been had. The chuck is provided at its central location with a gripping aperture 15 which is adapted to embrace the threaded stud 16 of a removable spool 17 upon which a coil is to be wound. The spool 17 is prefabricated and is adapted to be positioned in the chuck 10 by closing the adjustable chuck parts by means of a screw-tightening device 18 which is manually operable by the operator to insert or remove the threaded stud 16 into the aperture 15 of the chuck 10.

The spool or bobbin 17 is provided with transverse heads 19 and 20, the distance between being variable depending upon the size of the coil desired. Both heads are preferably stapled or otherwise suitably attached to a metallic central spindle or core 21 which is made of magnetic material such as soft iron. In order to insulate the strands of wire positioned about the spindle 21 from the heads 19 and 20, insulating discs or plates 22 and 23 are provided. The disc 23 may be, if desired, positioned loosely upon the spindle 21, so that it will be capable of being slid longitudinally along the spindle so as to substantially contact the insulating plate 22. The purpose of this structure will be described hereinafter.

Adjacent the front face of the chuck 10, and positioned parallel therewith, a flanged vertical plate 26 is provided which is preferably relatively heavy, being fixed to a base member 27 by means of screws 28 extending through the flanged portion so as to hold the plate very rigidly in juxtaposition with the chuck 10. The plate 26 is provided with projecting studs 29 and 30 having adjacent their outer end, heads 31 and 32 which prevent sheaves 33 and 34, which are mounted upon studs 29 and 30 respectively, from moving outwardly too far along the studs to become disengaged therefrom. The studs 29 and 30 extend parallel to the axis of rotation of the spool for at least the length of the spool and are preferably given a very high polish so as to make them very smooth and form substantially frictionless journals for the sheaves 33 and 34 which may very easily slide along them with very small lateral thrust being applied thereto. In order to improve this sliding relation, the sheaves are provided with elongated journal members 35 and 36 which are also highly polished internally to improve the bearings formed for the sheaves 33 and 34.

The stud 29 is located relatively close to the center of rotation of the chuck 10 and is positioned slightly above as is clearly shown in Figure 1. The stud 30, however, is located approximately twice the distance from the axis of rotation of the chuck 10 and also is located considerably higher than the stud 29.

On the rear side of the plate 26, an elongated tensioning arm 40 is positioned, being pivoted about a stud 41 which preferably screws into the plate 26. Looking at Figure 2, the left end of the arm 40 has its motion limited by a stop 42, against which the arm is forced by means of a resilient spring 43 which cooperates between an aperture 44 in the opposite end of the arm and an anchor on the base 27. At an intermediate position, preferably relatively close to the aperture 44, a headed elongated stud 45 is provided which is very similar to the headed studs 29 and 30 already described. Upon this stud, another sheave 46 is provided which is very similar to the sheaves 33 and 34.

The purpose of the sheave 46 is to maintain a predetermined amount of tension on the continuous strand of wire which is looped thereunder and partially embraces the sheave 46. The tension in the wire is further maintained by a tensioning device T which may be of any desirable form, being preferably mounted above the level of the sheave 46 as is clearly shown in Figure 1. Immediately below the tension device T, a vertical spindle U is provided upon which is mounted a wire spool S, the wire being removed from the spool by a rotating device R to prevent snarling and tangling. The tension device T, the anti-snarling and spool mounting devices are well known in the art and need not be described in further detail.

The continuous strand of wire from the spool is first led through the eye E of the anti-snarling device R, thence through the tension device T, under the sheave 46, over the sheave 34 and thence downwardly to the bobbin or spool core 21 which it partially embraces and then cooperates with the sheave 33 to form an elongated loop. The end of the wire is finally attached to the bobbin, as is clearly shown in Figure 3, by being threaded through an aperture 20a which is formed in the insulating plate 22 and the metallic header 20. For convenience in mounting this wire in proper relation with the chuck 10, the end of the wire is placed under a leaf spring-holding device 10a which is attached to the chuck portion by means of a screw 10b. The wire is slipped beneath the spring member 10a which grips it and holds it in firm relation during the winding operation.

After the coil is completely wound, the continuous strand of wire, which is still connected to the spool S, is pulled forwardly and is thrust under a holding device 26a which may consist of two leaf springs attached by a screw 26b to the plate 26 as is clearly shown in Figures 1 and 2. After the wire is positioned in this holding device, it is cut by the operator by means of a scissors to free the coil from the continuous strand of wire. This loose end is then threaded through an aperture 22a (Figure 3) on a laterally projecting portion of the insulating plate 22, so that the coil may be prevented from unrolling during further processes of fabrication.

The operation of the winding device is as follows: With the chuck 10 in relatively open position, the operator mounts a bobbin in the aperture 15, the bobbin previously having the end of the continuous strand of wire from the spool S threaded through its aperture 20a. Then the operator tightens the chuck 10 by means of a wrench applied to the tightening device 18, so that the projection 16 of the spindle 21 is firmly gripped by the chuck so as to rotate about its true center. The end of the wire is then positioned under the holding device 10a, so that it is prevented from interfering with the winding of the coil while the bobbin is being rotated at relatively high speed. The operator then takes the wire which is attached to the bobbin at the aperture 20a and threads the wire over the sheave 33, beginning at the upper side and continuing around the sheave as shown in Figure 3. From the bottom side of the sheave 33, the wire is again led over the spindle 21 and then continues up and is threaded over the sheave 34, then under the tensioning sheave 46 and into the tensioning device and spool S as is clearly shown in Figure 1.

It is preferable at this point, before beginning rotation of the bobbin, to insure that the beginning turn of the coil is flatly positioned against the insulating plate 22 on the upper end of the bobbin (Figure 2) for the operator to slide the lower insulating disc 23 along the spindle 21 to urge the wire against the insulating plate 22 as already described. While the operator is momentarily urging the insulating disc 23 upwardly (Figure 2) to accomplish this purpose, the manual switch 13 in the motor power circuit is closed and the motor begins to rotate the bobbin in a counterclockwise direction (Figure 1), so that the wire is wound onto the spindle 21 from the upper side of the sheave 33. It will be clear that the wire, in order to be positioned on the spindle 21, must continue from the sheaves 46 and 34 first over the spindle 21 thence over the sheave 33 and then to the winding location where it is placed upon the spindle 21 in final position in the bobbin.

From this it is clear that wire portion 50, which is located between the spindle 21 and the sheave 33, is wound at all times between wire portion 51, which is located between the spindle 21 and the upper sheave 34 and turn 52 which has just been wound on the spindle by the rotation thereof. The wire portion 51, therefore, has a tendency to constrict the space in which the wire portion 50 is being wound upon the spindle 21 and hence urges by reaction the wire portion 50 at all times into close cooperation with the turn 52 which has just been wound upon the spindle. This action insures that the turns wound upon the spindle 21 are in touching relation with each other as they are being wound thereon.

As the wire is being wound on the spindle 21, the winding plane advances toward the second or outer head 19 of the bobbin. In order that the relation between the spindle 21 and sheaves 33 and 34 shall remain substantially the same in the winding plane as it advances from side to side or from head to head, it is essential that the sheaves 33 and 34 and to a lesser extent sheave 46 shall advance with the winding plane, so that a substantially parallel relation shall be maintained which will be substantially normal to the axis of rotation of the bobbin although a slight lag of the sheaves is observable. The winding plane as it advances across the spindle places a lateral thrust on the wire strand which is sufficient to move the sheaves particularly sheaves 33 and 34 along their mounting studs 29 and 30 to maintain the substantially parallel relation of the sheaves and the winding plane, or to put it in other words, the normal relation between the wire strand and the winding spindle.

The wire portion supported between the spindle 21 and the sheave 33, and the wire portion 51 form a drag member integral with the wire strand, which urges the wire portion 50 just being wound upon the spindle into close cooperation with turn 52 which has just been wound. The constricting action described above and the reaction upon the wire portion just being wound is caused by the lag in movement of the sheaves 33 and 34 which creates a dragging effect.

This winding action continues until the opposite end of the bobbin is reached, at which time the wire portion 51 comes into contact with the lower head 23 (Figure 2) of the bobbin and rides up on the wire portion 50 at that instant and then drops back again on the opposite side of wire portion 50 to maintain the same relative position between the wire portions. In other words, the wire portion 51 at all times leads the wire portion 50 and maintains the same constricting action throughout the winding of the coil. During the winding of the first layer on the spindle 21, the wire will be as shown in Figure 3 wherein the wire portion 51 will be on the right of the wire portion 50 as shown, or referring to Figure 2, the wire portion 51 will be below the wire portion 50. In the second layer, however, the positions will be exactly reversed because the direction of winding is reversed. In other words, the wire portion 51 in the second layer will be to the left of the wire portion 50 if seen as in Figure 3, or referring to Figure 2, the wire portion 51 will be above the wire portion 50. The third layer will follow the sequence of the first layer, etc.

This winding action will continue in layers until the predetermined number of turns have been placed upon the bobbin as is established by the desired electrical characteristics of the finished coil. This is automatically controlled by the mechanism 14 which includes a counter and a controlling device for the motor 11. It may act upon the manual switch 13, so that the start of the winding cycle is under the control of the operator, while the termination of the winding period is at all times under the control of the automatic device which is actuated by the counter when the predetermined number of turns have been wound upon the bobbin. At this time, the operator places the continuous strand under the holding device 26a and cuts the completely wound coil from the strand between the holding device 26a and the coil. The end of the wire is then inserted in the aperture 22a as has already been described and the completed coil is removed from the chuck 10 by loosening the tightening device 18 with a tool. A new bobbin is then inserted in the chuck and a new winding cycle begins.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a machine of the class described, a bobbin upon which a coil is to be wound from a continuous strand, means to rotate the bobbin, a rotatable and slidable sheave movable along its axis parallel to the axis of rotation of the bobbin, the strand to be wound on the bobbin advancing around the rotating bobbin in contact with the last wound portion and around the rotating sheave and into its final winding position in the coil forming a loop embracing the bobbin and the sheave, said sheave advancing as the winding proceeds to maintain the plane of the loop in the strand substantially normal to the axis of the rotating bobbin.

2. In a device of the class described, a rotating bobbin upon which a coil is to be wound from a continuous strand, means including a portion of the bobbin to support a continuous loop in the strand being wound, one end of the loop moving the strand into winding position on the bobbin, the other end of the loop proceeding from the strand supply, and movable loop conveying means to allow the loop to advance forwardly in contact with the convolutions on the bobbin to maintain the loop substantially normal to the rotating bobbin.

3. In a device of the class described, a rotating bobbin upon which a coil is to be wound from a continuous strand including a cylindrical spindle, means including the spindle of the bobbin to support a loop in the strand, one bight of the loop embracing the spindle in touching relation with the end of the strand moving into winding position on the spindle, and movable loop carrying means to allow the loop to advance forwardly with the winding location on the spindle of the bobbin as a layer is being formed thereon to maintain the loop in substantially normal relation with the spindle.

4. In a device of the class described, a rotating bobbin upon which a coil is to be wound from a continuous strand including a cylindrical spindle, means including a rotatable sheave and the spindle of the bobbin to support a continuous loop in the strand, one bight of the loop embracing the spindle in touching relation with the portion of the strand which is just being wound on the spindle, and means cooperating with the sheave to allow the sheave to slide whereby the loop is advanced forwardly with the winding location on the spindle to maintain the loop substantially in normal relation with the spindle of the rotating bobbin.

5. In a device of the class described, a rotating bobbin upon which a coil is to be wound from a continuous strand of wire, means including a portion of the bobbin to support a continuous loop in the strand of wire, one end of the loop moving the strand into winding position on the bobbin, the other end of the loop proceeding from the strand supply, resilient means to maintain a predetermined tension on the strand and means to allow the loop to advance forwardly with the winding location on the bobbin to maintain the loop in substantially normal relation to the rotating bobbin.

6. In a machine of the class described, a bobbin including a cylindrical spindle upon which a coil is to be wound from a continuous strand, means to rotate the bobbin, a pair of sheaves, means cooperating with the sheaves to allow rotation thereof and movement along their axes of rotation parallel to the axis of rotation of the bobbin, means to maintain a predetermined tension upon the strand, said strand advancing over one sheave and then around the spindle of the bobbin in touching relation with the portion which is just being wound on the spindle, thence over the second sheave and moving therefrom into its final winding position on the spindle thereby forming a loop in the strand embracing the spindle of the bobbin and the second sheave, said sheaves being adapted to advance as the winding proceeds to maintain the plane of the loop in substantially normal relation to the axis of the spindle of the rotating bobbin.

7. The machine defined in claim 6 further characterized by having the sheaves displaced in a manner so that the strand proceeding from the first sheave around the spindle of the bobbin is displaced at an angle to the strand portions forming the loop.

8. In a device of the class described, rotatable means upon which a coil is to be wound from a continuous strand in several superimposed layers, drag means integral with the continuous strand cooperating by contactual relation with the portion just being wound to urge said portion just being wound into touching relation with the turn just previously wound, and slidable rotatable carrying means to advance said drag means as the location of winding advances to form a layer.

9. In a device of the class described, rotatable means upon which a coil of wire is to be wound in several superimposed layers from a continuous strand, drag means for the strand of wire contactually cooperating with the wire portion just being wound to urge said portion just being wound into touching relation with the turn just previously wound, slidable rotatable carrying means actuated by the wire portion just being wound to advance said drag means as the location of winding advances to form a layer.

10. In a device of the class described, rotatable means upon which a coil is to be wound from a continuous strand in several superimposed layers, drag means for the strand cooperating by contactual relation with the portion of the strand just being wound to urge said portion just being wound into touching relation with the turn just previously wound, resilient means to maintain a predetermined tension upon said strand, and means to advance said drag means as the location of winding advances to form a layer.

11. In a device of the class described, rotatable means upon which a coil of wire is to be wound from a continuous strand in several superimposed layers, drag means for the continuous strand of wire cooperating by contactual relation with the wire portion just being wound to urge said portion just being wound into touching relation with the turn just previously wound, means to maintain a predetermined tension upon said wire strand, means to advance said drag means as the location of winding advances to form a layer, and a layer length-determining device cooperating with the drag means for automatically reversing the position of said drag means with reference to the wire portion just being wound upon the finishing of a first layer so as to continue in relatively the same position to wind a second layer superimposed upon said first layer.

12. In a machine of the class described, a bobbin including a cylindrical spindle upon which a coil is to be wound from a continuous strand in superimposed layers, means to rotate the bobbin, a pair of rotatable sheaves, means cooperating with the sheaves to allow rotation thereof and movement along their axis of rotation parallel to the axis of rotation of the bobbin, means to maintain a predetermined tension upon the strand being wound, said strand advancing over one sheave and then around the spindle of the bobbin in touching relation with the portion of the strand which is just being wound on the spindle, thence over the second sheave and moving therefrom into its final winding position on the spindle whereby a loop is formed in the strand embracing the spindle of the bobbin and the second sheave, said sheaves being adapted to be advanced by the action of the loop as the winding proceeds to maintain the plane of the loop in substantially normal relation to the axis of the spindle of the rotating bobbin.

13. The machine defined in claim 12 further characterized by having a third sheave cooperating with the strand in a position advanced from the position of the first sheave whereby the strand is conveniently guided in a proper direction to cooperate with the first aforementioned sheave.

14. In a machine of the class described, a bobbin including a cylindrical spindle upon which a coil is to be wound from a continuous strand in superimposed layers, means to rotate the bobbin, a pair of rotatable sheaves, spindle means cooperating with each of the sheaves to allow rotation thereof and extending longitudinally parallel to the axis of rotation of the bobbin to allow movement of the sheaves in a direction parallel to said axis of rotation of the bobbin, means to maintain a predetermined tension upon the strand, said strand advancing over one sheave and then around the spindle of the bobbin in touching relation with the portion of the strand which is just being wound on the spindle, thence around the second sheave and moving therefrom into its final winding position on the spindle whereby a loop is formed in the strand embracing a spindle of the bobbin and the second sheave, both of said sheaves being adapted to advance along the spindle means by a lateral thrust of the strand being wound to maintain the plane of the loop in substantially normal relation to the axis of the spindle of the rotating bobbin as the winding position advances to form the layer.

15. The machine defined in claim 14 being further characterized by a third sheave cooperating with the strand in a position advanced of the said first sheave having also a spindle means to allow movement thereof along a line substantially parallel to the axis of rotation of the bobbin, said sheave guiding the strand to facilitate movement of the strand over the first sheave as the winding of the layer proceeds on the bobbin.

KARL H. WEBER.